United States Patent
Mele

(10) Patent No.: US 7,013,549 B1
(45) Date of Patent: Mar. 21, 2006

(54) METHOD OF MAKING A DECORATIVE ARRANGEMENT

(76) Inventor: Camillo Mele, 310 Tally Dr., Pittsburgh, PA (US) 15237

( * ) Notice: Subject to any disclaimer, the term of this patent is extended or adjusted under 35 U.S.C. 154(b) by 0 days.

(21) Appl. No.: 10/672,449

(22) Filed: Sep. 26, 2003

Related U.S. Application Data

(60) Provisional application No. 60/415,663, filed on Oct. 3, 2002.

(51) Int. Cl.
*B23P 19/04* (2006.01)

(52) U.S. Cl. .......................... 29/460; 29/458; 29/527.1; 29/527.2; 47/41.11; 47/41.12; 47/41.13; 47/44

(58) Field of Classification Search .............. 47/41.01, 47/41.11, 41.12, 41.13, 41.14, 43, 44; 29/450, 29/458, 460, 527.1, 527.2
See application file for complete search history.

(56) References Cited

U.S. PATENT DOCUMENTS

| | | | | |
|---|---|---|---|---|
| 1,295,581 A | * | 2/1919 | Palmer | 47/41.01 |
| 2,837,855 A | * | 6/1958 | Hoke | 264/138 |
| 2,922,254 A | * | 1/1960 | Smithers | 47/41.12 |
| 2,994,985 A | * | 8/1961 | Jackson, Jr. | 47/41.11 |
| 3,003,284 A | * | 10/1961 | Smithers | 47/41.12 |
| 3,073,062 A | * | 1/1963 | Hoffman | 47/41.12 |
| 3,310,912 A | * | 3/1967 | Melander | 47/41.12 |
| 3,336,697 A | * | 8/1967 | Davis | 47/41.12 |
| 3,368,303 A | * | 2/1968 | Tong | 47/41.12 |
| 3,374,575 A | * | 3/1968 | Tong | 47/41.12 |
| 3,651,601 A | * | 3/1972 | La Montagne | 47/41.12 |
| 3,949,568 A | * | 4/1976 | Gallagher | 63/36 |
| 4,044,502 A | * | 8/1977 | Hillenbrand | 47/41.12 |
| 4,143,191 A | * | 3/1979 | Chavis | 428/13 |
| 4,221,078 A | * | 9/1980 | Latham et al. | 47/41.01 |
| 4,225,679 A | * | 9/1980 | Pilato | 504/115 |
| 4,941,572 A | * | 7/1990 | Harris | 206/423 |
| 5,057,546 A | * | 10/1991 | Sudan | 521/107 |
| 5,235,780 A | | 8/1993 | Colbert | |
| 5,605,012 A | * | 2/1997 | Weder et al. | 47/64 |
| 5,970,654 A | * | 10/1999 | Skinner | 47/41.01 |
| 6,145,245 A | * | 11/2000 | Honkawa et al. | 47/41.01 |
| 6,421,955 B1 | * | 7/2002 | Wilson | 47/41.12 |

(Continued)

FOREIGN PATENT DOCUMENTS

FR     2 454 752    * 11/1980

(Continued)

*Primary Examiner*—Essama Omgba
(74) *Attorney, Agent, or Firm*—Grant E. Coffield; Arnold B. Silverman; Eckert Seamans Cherin & Mellott, LLC

(57) ABSTRACT

A method of making a decorative arrangement includes providing a wet foam, securing a plurality of decorative elements which may, for example, consist of live flowers or other live vegetation, dried flowers or other dried vegetation, artificial flowers or other artificial vegetation and additional ornaments. A plurality of decorative elements are secured to the wet foam and the wet foam is subsequently permitted to dry or dried. The wet foam may be applied to a release surface or to a support structure. Portions of the decorative arrangement may be made by sequential applications of wet foam, if desired. The wet foam, after partial curing, is shaped to provide a nodule within which the decorative elements are placed. The surface of the foam may be wet, as by spraying water thereon prior to shaping and partial curing, and may also be sprayed thereafter as by spraying water thereon. Further decorative procedures may be followed, such as employing a tool to place a cut or depression in the surface of the nodule, spray painting portions of the nodule, and combinations thereof.

23 Claims, 6 Drawing Sheets

U.S. PATENT DOCUMENTS

| | | | |
|---|---|---|---|
| 6,957,512 B1 * | 10/2005 | Bakula et al. | 47/62 A |
| 2003/0093947 A1 * | 5/2003 | Gilberg | 47/41.01 |
| 2004/0200142 A1 * | 10/2004 | Ito | 47/41.14 |
| 2005/0011116 A1 * | 1/2005 | Miller et al. | 47/41.13 |
| 2005/0015961 A1 * | 1/2005 | Mele | 29/460 |

FOREIGN PATENT DOCUMENTS

| | | |
|---|---|---|
| FR | 2 693 092 | 2/1992 |
| FR | 2454-752 | 4/2004 |
| GB | 2176399 A | * 12/1986 |

* cited by examiner

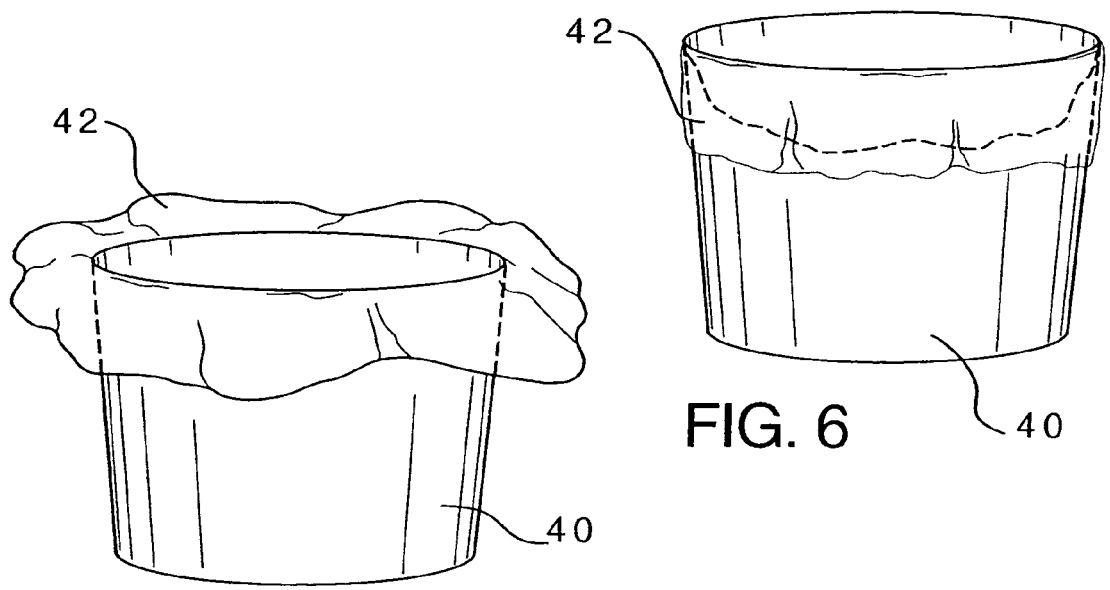
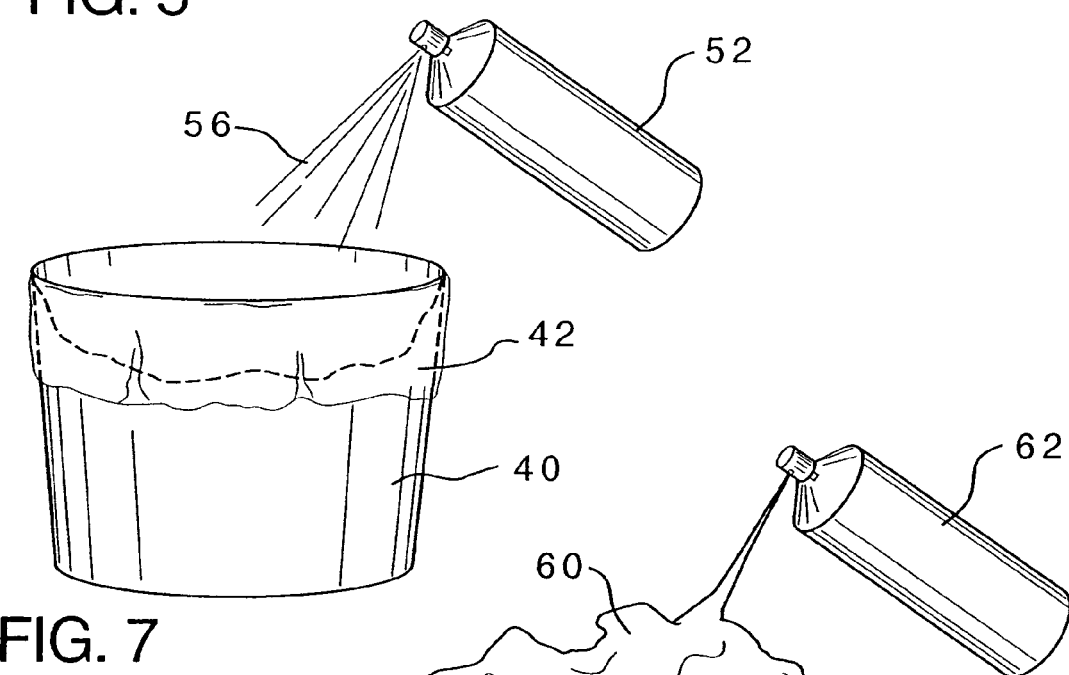

METHOD OF MAKING A DECORATIVE ARRANGEMENT

CROSS-REFERENCE TO RELATED APPLICATION

This application claims the benefit of U.S. Provisional Application Ser. No. 60/415,663, entitled "METHOD OF MAKING A DECORATIVE ARRANGEMENT" filed Oct. 3, 2002.

BACKGROUND OF THE INVENTION

1. Field of the Invention

The present invention relates to a method of making decorative arrangements which are initially formed within a wet foam which is subsequently dried to establish a rigid foam within which a plurality of decorative elements are securely retained.

2. Description of the Prior Art

In the floral business, it is common to provide various sorts of decorative arrangements which may consist of (a) arrangements of fresh flowers or other fresh vegetation, such as ferns, for example, or (b) dried flowers or other types of dried vegetation, or (c) artificial flowers or other types of artificial vegetation with or without additional ornamental objects. It has also been known to provide various combinations of the foregoing.

It has been known to provide for decorative purposes within buildings and on porches and patios, combinations of living plants assembled in soil in a suitable container as in a "dish garden." It has also been known to cut living plants and to provide arrangements which have a more limited life expectancy. Such arrangements may be as simple as cut flowers presented in a suitable vase containing water.

It has been known to employ rigid resinous foam as a means for facilitating relative positioning of real or artificial flowers or plants, or combinations thereof, in creating a decorative arrangement. Among the problems encountered in connection with the use of such rigid foam, such as styrofoam, for example, is the difficulty in inserting stems of flowers into the foam without breaking the foam or the stems. It has also been known to employ picks which have a nail-like penetrating base at the lower end for penetrating the rigid foam and an upwardly open receptacle for receipt of the flowers. A further problem with such rigid foam arrangements is the fact that certain fragile flowers cannot be introduced into the foam without damage to the flowers. It is difficult, for example, to employ hydrangea or baby's breath with such materials. This inability serves to place a limit on artistic creativity and aesthetic benefits of the arrangement.

It has also been known to provide foam which can be soaked in water with fresh flowers being inserted into the foam. A suitable product for this purpose is that sold under the trade designation Oasis by Smithers Oasis.

It has been known to create wreaths from any of the above-described materials through the use of a wire frame to which the decorative members are secured. One problem with such arrangements is that it is a very labor-intensive, time-consuming job. Such wreaths are frequently created by providing rigid foam within portions of the wreath frame and inserting wreath components into the rigid foam. It has also been known to use a hot melt glue to secure the decorative portions to the frame. Similarly, in making swags, a number of the foregoing difficulties have been encountered with the result being substantial investment of time in creating the arrangements and the relatively high cost due to the labor-intensive nature of the chore.

It has been known to provide an artificial plant in a large floor supported container by the introduction of foam into the container with or without other materials, such as underlying gravel, for example, in the pot for purposes of stabilizing the plant position within the pot.

U.S. Pat. No. 5,235,780 discloses a frame for supporting living plants. German patent 3042429 discloses a flower vase filled with rigid foam block which may be polyurethane foam cast into the case. Plants, twigs and other items may be secured within the foam. One of the problems with such foam is that more fragile plants, such as baby's breath, for example, require insertion of a pick into the foam with the hollow pick receiving the stem of the plant.

French patent 2454752 discloses placing a hardenable material within a container with pins inserted for reinforcement. Film is provided thereover to maintain the material in a soft condition. Removal of the film is said to permit insertion of stems of flowers and similar items into the material before it dries. The material is not highly visible in view of its being positioned within a container and having a plurality of flowers concealing the same.

French patent 2693092 discloses a process of first molding a block of chemical foam after which it is placed in a bath of wet plaster to provide a covering therearound. It has been known to provide various forms of vases containing materials into which plant material may be placed for decorative purposes. See Aquacotta literature.

There remains, therefore, a very real and substantial need for a method of simply and effectively creating decorative arrangements.

SUMMARY OF THE INVENTION

The present invention has solved the above-described problems by providing a rapid and efficient cost-effective method of making a decorative arrangement. The method includes providing a wet foam which is permitted to partially cure to create a nodule, after which a plurality of decorative elements are secured thereto with subsequent curing permitting the nodule to cure fully. It is preferred that the nodule assume a highly visible position within the decorative arrangement. The wet foam prior to insertion of decorative elements may be wet as by spraying water thereon. It may also be wet after such partial curing as by spraying water thereon. The partially cured wet foam or nodule may be shaped to the desired configuration prior to insertion of the decorative elements and, subsequent to curing, may be subjected to decorative physical changes as by placing cuts or holes therein. Painting, as by spray painting, may be provided at desired locations for further decorative effect.

In one embodiment, the decorative arrangement may be made on a supporting structure which becomes part of the decorative arrangement, such as a wire frame for a wreath or other supporting structure. In other embodiments, no such supporting structure is provided and a release surface which does not bond to the foam being employed.

The wet foam is preferably one which has sufficient viscosity to permit ready positioning and securement of decorative elements thereto in the wet form and subsequent drying producing a rigid foam which retains the decorative elements in the desired arrangement.

Among the preferred foam materials are polyurethane foam and latex foam which may advantageously be provided in an aerosol container.

It is an object of the present invention to provide an improved method for rapid creation of decorative arrangements while resisting undesired damage to the supporting foam material and the decorative elements.

It is a further object of the present invention to provide such a method wherein a wide variety of decorative elements may be secured in numerous configurations with or without supporting structures.

It is a further object of the present invention to enable skilled or semiskilled workers to create a decorative arrangement in substantially reduced time, thereby permitting the decorative arrangements to be sold at a profit at a reduced price as compared with prior art practices.

It is a further object of the present invention to provide such a method which facilitates sequential creation of decorative arrangements.

It is another object of the present invention to provide a method of freely positioning a plurality of decorative elements in a supporting wet foam and firmly retaining said decorative elements in the rigid foam.

These and other objects of the invention will be more fully understood from the following description of the invention on reference to the illustrations appended hereto.

BRIEF DESCRIPTION OF THE DRAWINGS

FIG. 5 illustrates a container having a support for receiving wet foam.

FIG. 6 illustrates a film overlapped with the container.

FIG. 7 illustrates applying a release agent to the film.

FIG. 8 illustrates an aerosol delivering wet foam to the release film.

DESCRIPTION OF THE PREFERRED EMBODIMENTS

Figure 1:
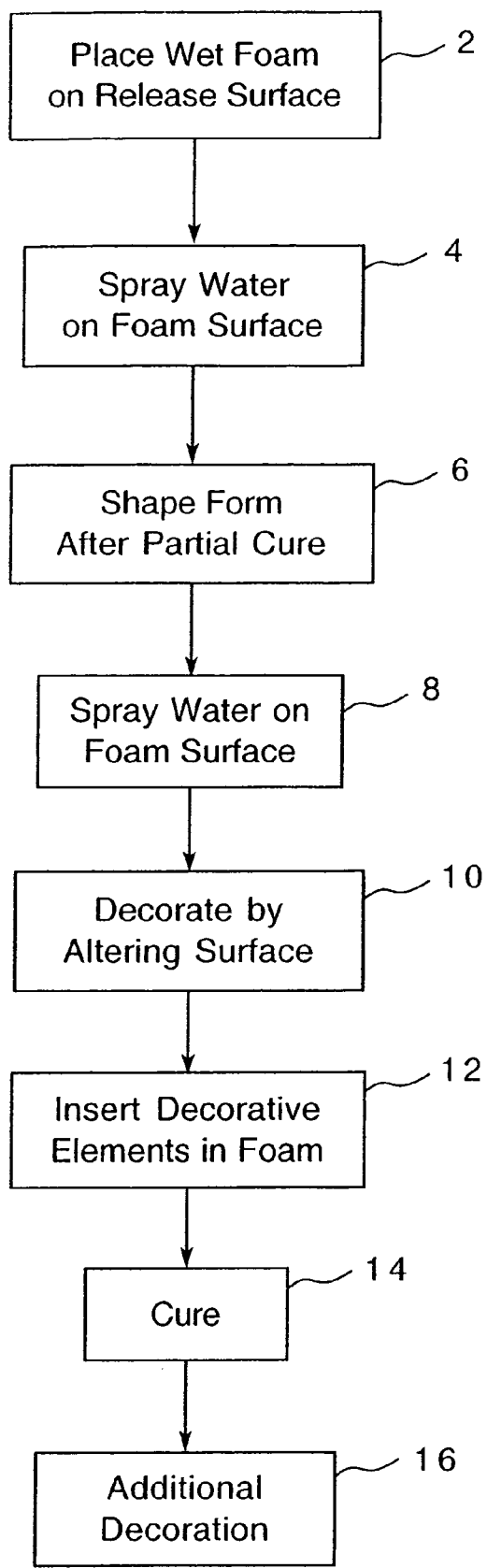
FIG. 1 is a flow diagram showing an embodiment of the method of the present invention.

Referring to FIG. 1 and a preferred embodiment of the method of the present invention, wet foam is delivered to a release surface 2, after which a liquid, such as water, is sprayed 4 on the foam surface. The foam is then shaped 6, after a partial cure, which may be a drying at ambient temperature or in an elevated temperature environment. Subsequently, liquid, such as water is sprayed 8 onto the foam surface. The partially cured foam is a "nodule" as defined herein. Either prior to full curing of the nodule or after, it may be decorated by altering the surface 10, such as by placing cuts or depressions in the surface, adding decorative elements, or spray painting portions of the nodule surface. Decorative elements 12, which may be living plants, dried plants, artificial plants and flowers, or other decorative elements 12 are inserted into the nodule prior to full curing. Subsequently, full curing is completed 14 with any desired additional decoration 16 being provided.

As employed herein, "decorative element(s)" means an element selected from the following group: (a) live flowers or other live vegetation, or (b) dried flowers or other dried vegetation, or (c) artificial flowers or other artificial vegetation.

The term "additional ornaments" means any desired additional decorative elements whether falling within categories (a), (b), (c) or independent such as ribbons, Christmas ornaments, containers for decorative elements, and other items which are or can be decorative in nature.

As used herein, "wet foam" means a moist resinous foam which receives decorative elements for a decorative arrangement and becomes rigid foam upon drying.

As used herein, the term "wreath" means a generally annularly shaped decorative arrangement regardless of whether it has an underlying wire support or other support apart from supporting foam.

As used herein, the term "swag" means an elongated decorative arrangement regardless of whether it has an underlying supporting structure or no support apart from supporting foam.

In general, the method of this invention will be practiced on a release surface which will be nonbinding in respect of the wet foam and the rigid foam which will be produced. A convenient method of accomplishing this objective is either to provide a worktable surface, which is generally nonbinding with respect to the foam, or to employ a plastic film or paper having such release properties. The foam may also be applied to a supporting structure which becomes part of the decorative arrangement.

Among the preferred wet foam materials are polyurethane foam and latex foam which may conveniently be dispensed from an aerosol container. Suitable polyurethane foams are those sold under the trade designation "Great Stuff" by the Dow Chemical Company and Touch'n Foam by Convenience Products of Fenton, Mo.

When the wet foam partially cures or cures into a nodule, a thin skin forms on the exterior, thereby facilitating external decoration and providing additional holding power.

Figure 2:
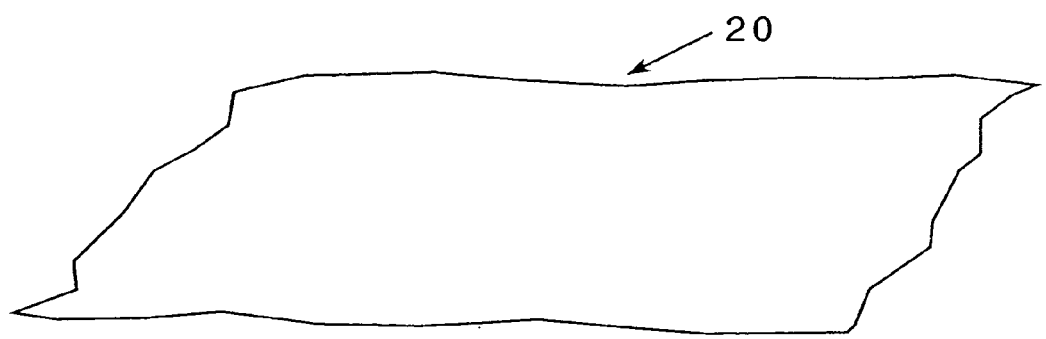
FIG. 2 illustrates a release film usable in one embodiment of the method of the present invention.

Referring to FIG. 2, there is shown a suitable release film 20 which may provide the desired support for the wet foam (not shown in this view) while resisting adherence of the foam to the release film.

Figure 3:
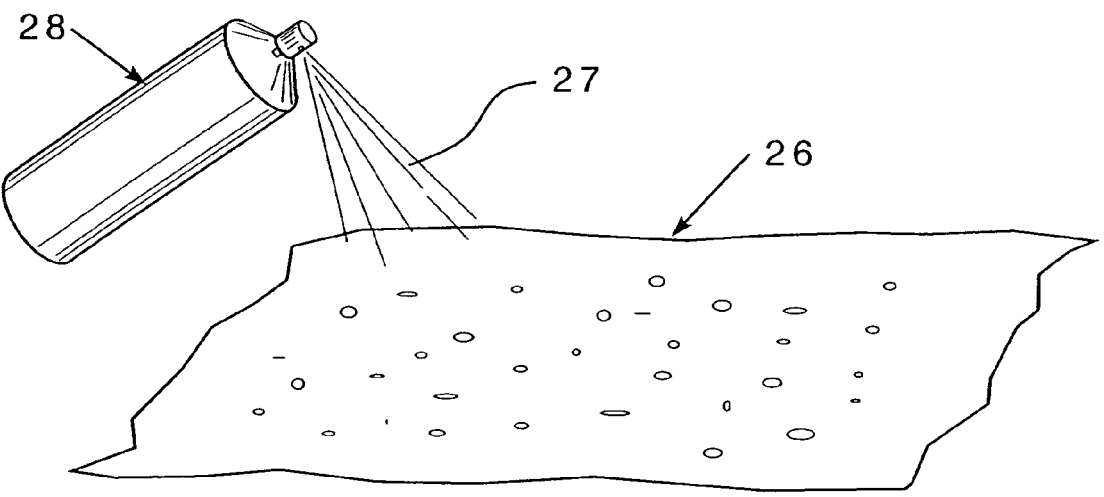
FIG. 3 illustrates spraying a release agent on a film.

In FIG. 3, an alternate film 26 which may lack the inherent release properties is employed with a suitable release agent 27 being dispensed thereon from an appropriate container.

Figure 4:
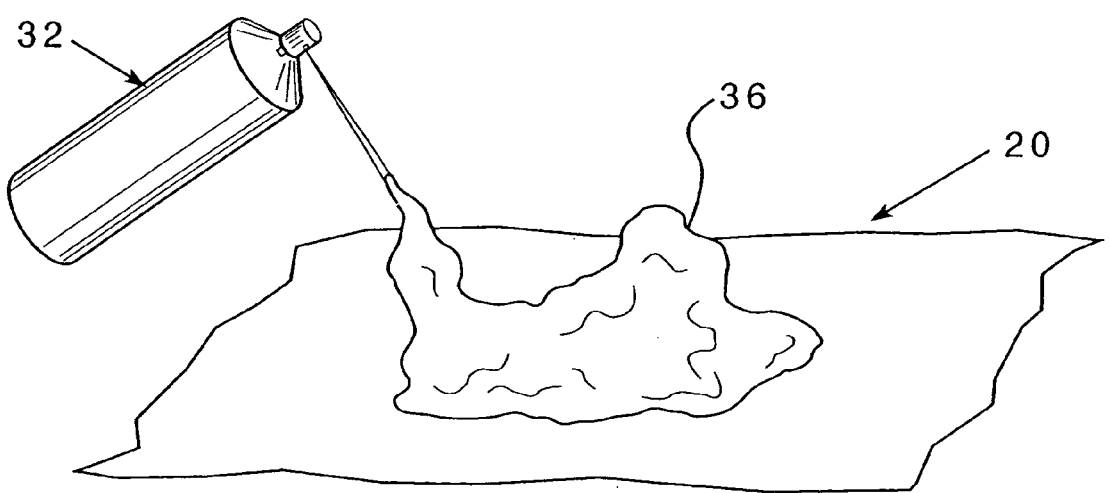
FIG. 4 illustrates employing an aerosol sprayer to deliver wet foam to the film.
Figure 9:
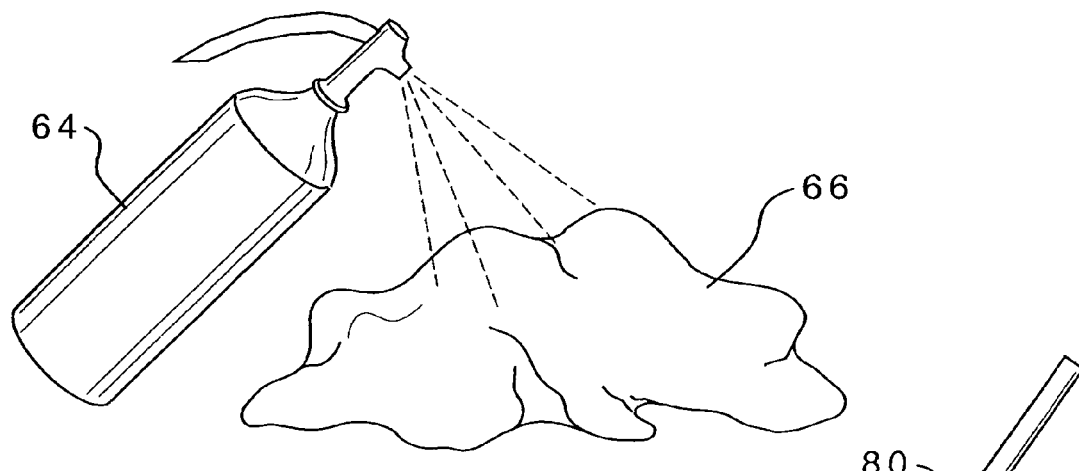
FIG. 9 illustrates wetting the surface of the wet foam or nodule by a suitable spray.

Next, as shown in FIG. 4, the wet foam 30 is dispensed from a suitable aerosol container 32 onto the surface of film 20. This wet film will, upon partial curing, become a nodule which is capable of being shaped and receiving decorative elements. As shown in FIGS. 5 and 6, a container 40 may be provided with a release film 42 which has portions extending over the exterior of the container and portions disposed within the container to receive a release agent 50 dispensed from aerosol container 52. After the release film is in suitable position, as shown in FIG. 7, the wet foam 60 is applied by aerosol container 62 in whatever volume is desired for the particular work. Regardless of whether the wet foam 30 is applied to the surface of a film 20, as in FIG. 4, or is applied within a container as in FIG. 8, it is preferred that a liquid such as water 64 is sprayed on the nodule 66, as shown in FIG. 9. This serves to help cure and aid in establishing a smooth skin surface for subsequent decoration, as by painting. Different textures in the nodule's surface may be provided in this manner. Other liquid such as acetone may be employed to establish other surface textures on the nodule. It will be appreciated that such spraying may take place at more than one time during curing. It is preferred that the nodule be sprayed before inserting decorative elements into the nodule.

It will generally be preferred to shape the nodule about 8 to 10 minutes after the wet foam has been dispensed. Liquid, such as water, may be sprayed on the nodule before shaping, as well as after.

Figure 10:
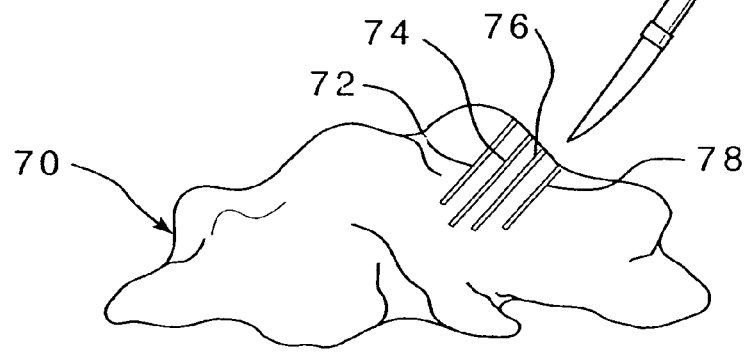
FIG. 10 illustrates a method of providing decorative elements in the surface of the nodule through a forming tool.

FIG. 10 shows a nodule 70 which has at least partially cured and is provided with decorative depressions 72, 74, 76, 78 by knife 80.

One of the features of the present invention is to provide nodules which are sufficiently attractive as to be positioned within the decorative arrangement in a highly visible location, as contrasted with numerous prior systems wherein rigid plastic foam was employed solely to purposes of retention of decorative elements, but was essentially completely hidden from view by either containers or the decorative elements or combinations thereof.

Figure 11:
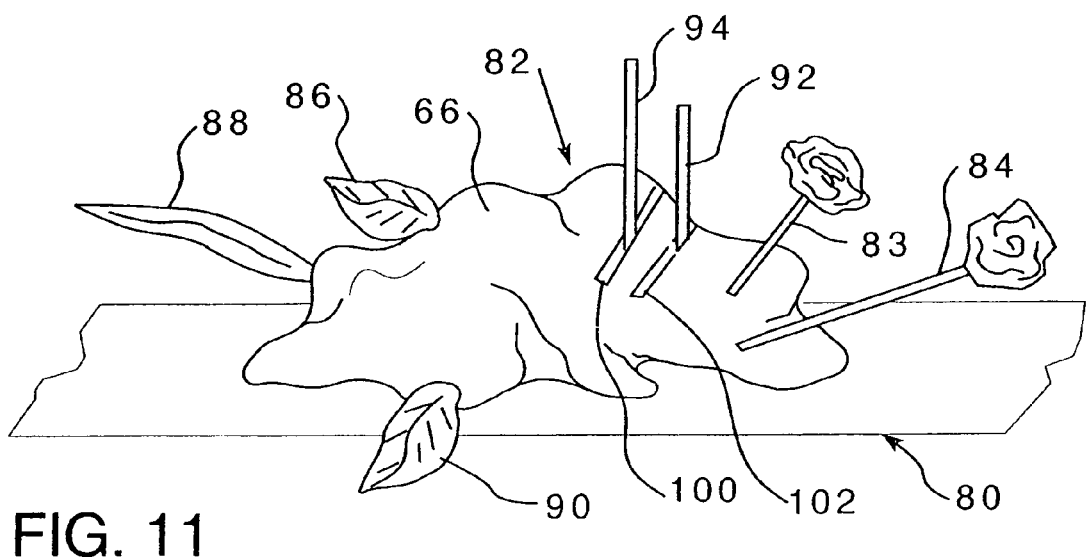
FIG. 11 illustrates a nodule having a plurality of decorative elements secured thereto.

As shown in FIG. 11, a support member 80 is secured to an overlying nodule 82 which is of irregular configuration and is provided with a plurality of decorative elements 84, 86, 88, 90, 92, 94. These may be living or dried plants, artificial plants or other desired elements. A plurality of slots, such as 100 and 102, are placed within the upper surface of the nodule for decorative effect.

Figure 12:
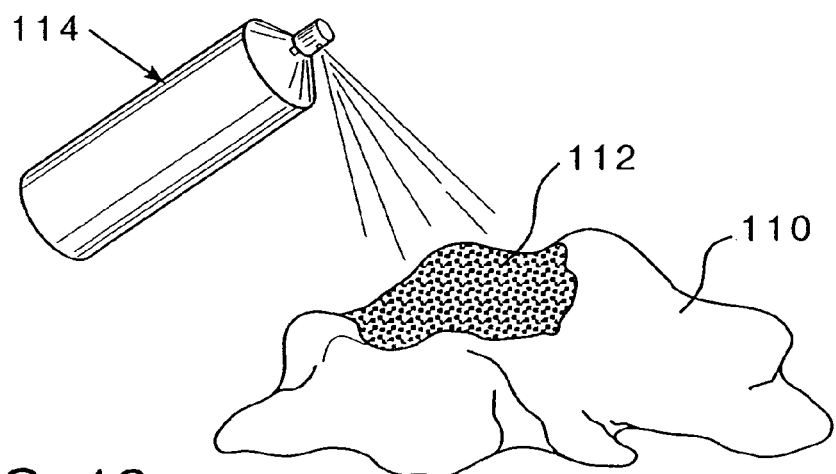
FIG. 12 illustrates spray painting a portion of the nodule's surface to enhance the decorative effect.

As shown in FIG. 12, a nodule 110 has a portion of its surface 112 covered by a decorative paint from aerosol spray container 114. The spray painting may be accomplished within 8 to 12 minutes after the wet foam has been dispensed.

Figure 13:
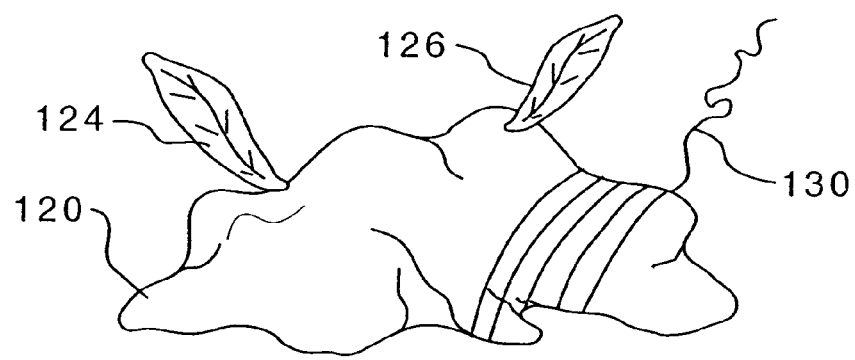
FIG. 13 illustrates wrapping of a decorative element around the exterior of the nodule.

Referring to FIG. 13, there is shown a nodule 120 having a pair of decorative elements 124, 126 and an elongated decorative wire or threadlike member 130 which is wrapped around the nodule after the nodule has completely cured or substantially completely cured.

Figure 14:
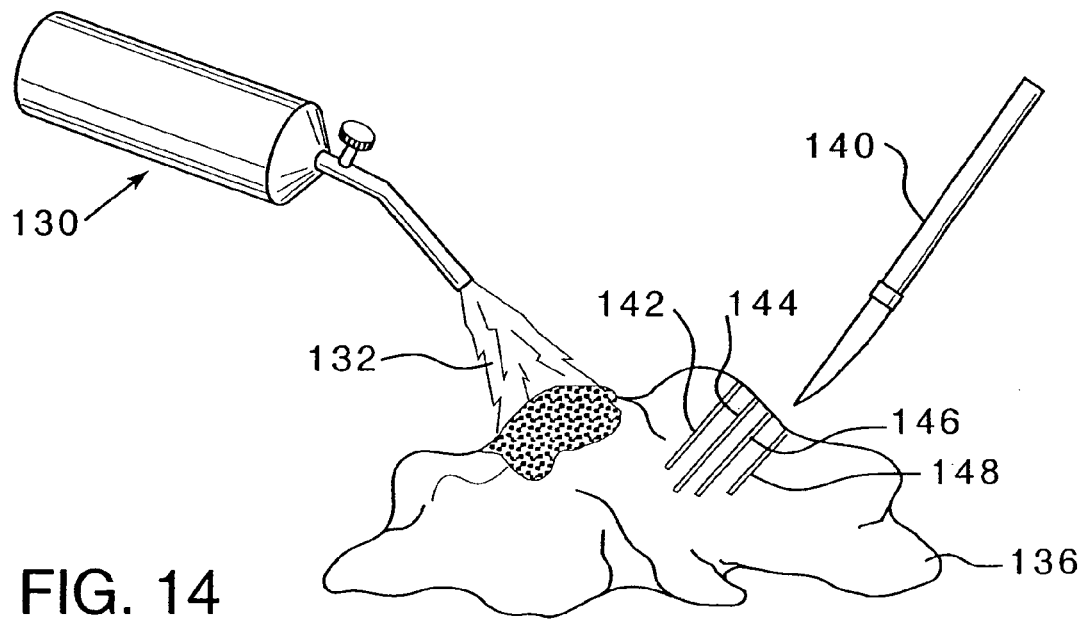
FIG. 14 illustrates a nodule having decorative spray paint applied thereto along with cuts therein.

Another manner of decorating the nodule is to employ a propane torch to create a charred effect or wood effect. This may be accomplished after partial curing and is preferably done after total curing. As shown in FIG. 14, a torch 130 is employed to provide a flame 132 to the surface of nodule 136. Also, a knife 140 has provided cuts 142, 144, 146, 148 to the surface of the nodule.

Figure 15:
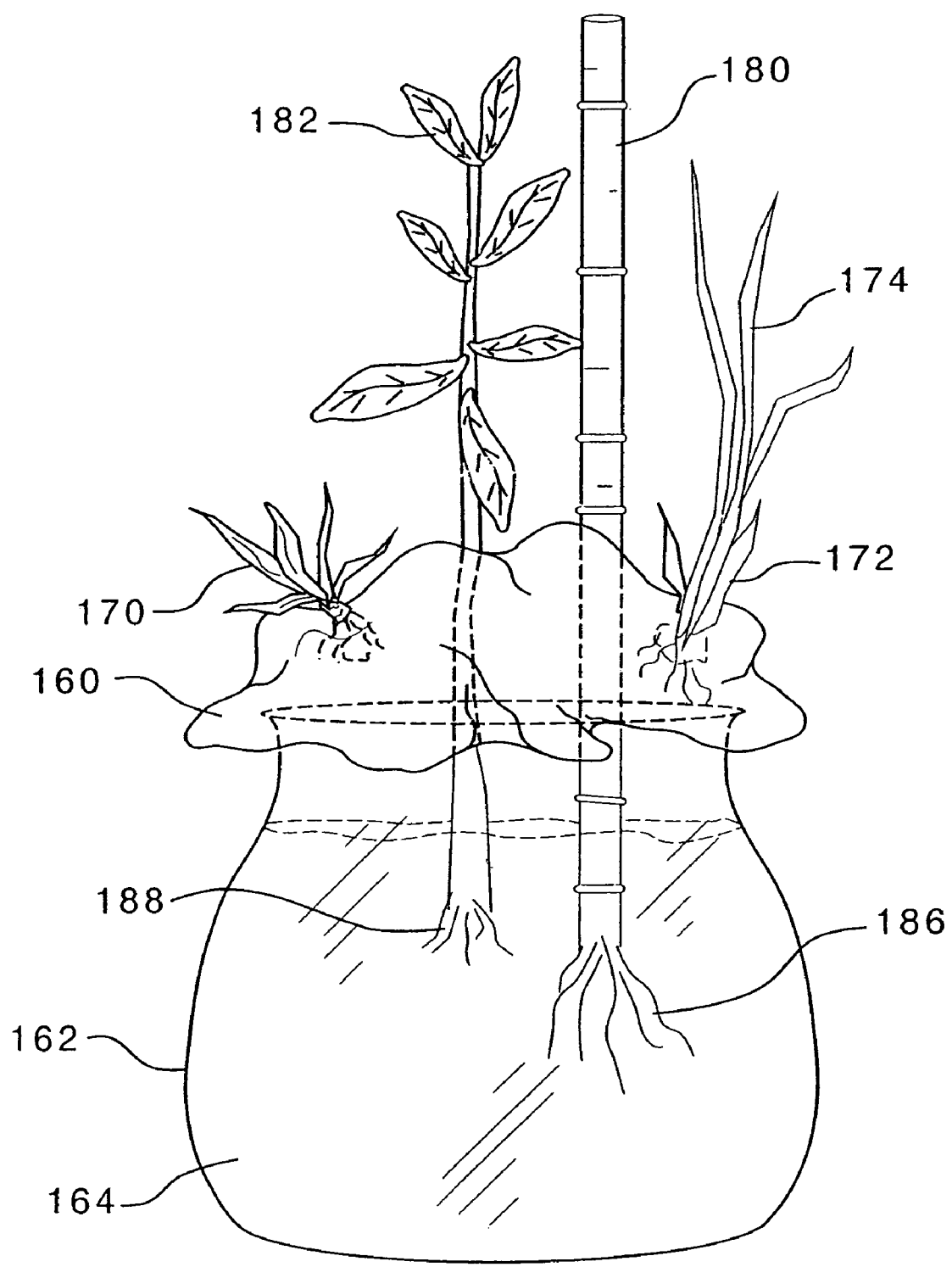
FIG. 15 shows a decorative arrangement having the nodule highly visible and containing living plant material.

Referring to FIG. 15, a nodule 160 overlies and is supported by a transparent bowl 162 which contains water 164. The nodule is highly visible and forms an integral part of the attractive decorative arrangement. The nodule has a pair of decorative elements 170, 172, 174 which may be living, dried or artificial plants. It also contains a pair of living plants 180, 182 which respectively have roots 186, 188 entering water 164.

It will be appreciated that the method of the present invention may be employed to create the decorative arrangements sequentially. For example, an initial stage the creation of the foam portions with the associated decorative elements and subsequently additional foam areas may be created and decorated on the support structure. Further, after the foam portions have become rigid additional wet foam may be placed thereon to superimpose different decorative elements thereon.

While reference has been made herein to drying of the wet foam into rigid foam at ambient conditions, it is preferred that the decorative arrangement be created in an environment which is at a temperature of about 60° F. to 100° F. and that drying take place for at least 30 minutes with full drying taking about 4 hours. Whether drying is permitted to occur at ambient temperature or is effected at an elevated temperature for convenience of reference herein, it will be referred to as drying the wet foam.

If a support structure is employed as part of a decorative arrangement, it will generally be preferred that it be substantially rigid so as to reinforce and protect the wet foam and the resultant rigid foam.

It will be appreciated, therefore, that the present invention provides a rapid and effective means of creating a wide array of decorative arrangements through the use of wet foam to which there is secured a plurality of decorative elements, after which the foam dries and becomes a rigid foam with the arrangement being secured in the desired configuration and of the desired appearance.

Whereas particular embodiments of the invention have been described herein for purposes of illustration, it will be appreciated by those skilled in the art that numerous variations of the details may be made without departing from the invention as recited in the appended claims.

The invention claimed is:

1. A method of making a decorative arrangement comprising
    providing a wet foam,
    partially curing said wet foam to create a nodule,
    shaping said nodule into a decorative structure,
    securing a plurality of decorative elements to said nodule prior to said wet foam becoming rigid foam, thereby forming an attractive decorative arrangement and
    subsequently drying said nodule to convert it to rigid foam wherein said nodule is exposed so as to be highly visible, the decorative structure forming an integral part of said attractive decorative arrangement.

2. The method of claim 1 including
    making said decorative arrangement by sequentially applying portions of at least some of said decorative elements to said nodule prior to complete drying of said nodule to convert it to said rigid foam.

3. The method of claim 1 including
    effecting said securing of said decorative elements by securing at least a portion thereof to the surface of said nodule.

4. The method of claim 3 including
    securing said wet foam to a support structure.

5. The method of claim 4 including
    providing said wet foam at least in part on said support structure.

6. The method of claim 3 including
    employing as at least some of said decorative elements at least one item from the group consisting of live vegetation, dry vegetation, and artificial vegetation.

7. The method of claim 3 including
    making a swag as said decorative arrangement foam.

8. The method of claim 4 including
    employing a rigid foam as said support structure.

9. The method of claim 4 including
    employing a container as said support structure.

10. The method of claim 1 including
    employing as said wet foam a foam which when partially cured will secure said decorative elements in said arrangement.

11. The method of claim 10 including
employing as said wet foam a foam selected from the group consisting of polyurethane foam and latex foam.

12. The method of claim 10 including
dispensing said wet foam from an aerosol container.

13. The method of claim 12 including
drying said wet foam at a temperature of about 60° F. to 100° F. for at least 30 minutes.

14. The method of claim 1 including
employing additional ornaments in said decorative arrangement.

15. The method of claim 1 including
after applying said decorative elements to said wet foam providing additional wet foam and applying additional decorative elements thereto.

16. The method of claim 15 including
providing said additional foam after the first applied wet foam has at least partially dried to become rigid foam.

17. The method of claim 1 including
establishing depressed portions within the surface of said nodule.

18. The method of claim 1 including
positioning said nodule within said decorative arrangement so as to retain said nodule in a readily visible position.

19. The method of claim 1 including
painting portions of the exterior of said nodule.

20. A method of making a decorative arrangement comprising
providing a wet foam,
partially curing said wet foam to create a nodule,
shaping said nodule,
securing a plurality of decorative elements to said nodule prior to said wet foam becoming rigid foam,
subsequently drying said nodule to convert it to rigid foam, and
placing said wet foam at least in part on a film having a release surface to which said foam will not bind.

21. A method of making a decorative arrangement comprising
providing a wet foam,
partially curing said wet foam to create a nodule,
shaping said nodule,
securing a plurality of decorative elements to said nodule prior to said wet foam becoming rigid foam,
subsequently drying said nodule to convert it to rigid foam,
effecting said securing of said decorative elements by securing at least a portion thereof to the surface of said nodule, and
wetting said foam prior to said partial curing.

22. A method of making a decorative arrangement comprising
providing a wet foam,
partially curing said wet foam to create a nodule,
shaping said nodule,
securing a plurality of decorative elements to said nodule prior to said wet foam becoming rigid foam,
subsequently drying said nodule to convert it to rigid foam,
effecting said securing of said decorative elements by securing at least a portion thereof to the surface of said nodule,
securing said wet foam to a support structure,
providing said wet foam at least in part on said support structure, and
wetting said nodule prior to said subsequent drying.

23. The method of claim 22 including
making a wreath as said decorative arrangement.

* * * * *